United States Patent [19]

Brower et al.

[11] 4,226,818
[45] Oct. 7, 1980

[54] PRODUCTION OF POLYVINYLBUTYRAL SHEET ROLLS

[75] Inventors: Van Pelt Brower, Wilbraham; Robert A. Esposito, Granby; Thomas E. Soar, Holyoke, all of Mass.

[73] Assignee: Monsanto Company, St. Louis, Mo.

[21] Appl. No.: 47,519

[22] Filed: Jun. 8, 1979

[51] Int. Cl.² ............................................. B29C 25/00
[52] U.S. Cl. ............................ 264/40.1; 264/342 RE; 264/346; 264/348
[58] Field of Search .................. 264/28, 40.1, 40.7, 264/342 R, 342 RE, 345, 346, 348, 232, 233, 234, 235, 237; 242/74, 75.51; 525/61; 528/481

[56] References Cited

U.S. PATENT DOCUMENTS

| | | |
|---|---|---|
| 3,061,886 | 11/1962 | Seager et al. |
| 3,179,245 | 4/1965 | Bastian |
| 4,035,549 | 7/1977 | Kennar .......................... 428/409 |
| 4,146,190 | 3/1979 | Bond .......................... 242/75.51 |

Primary Examiner—James B. Lowe
Attorney, Agent, or Firm—David Bennett; William J. Farrington; Edward P. Grattan

[57] ABSTRACT

A process comprising winding polyvinylbutyral interlayer sheet at a controlled low tension reduces blocking at the core of the roll and minimizes stretch variations within the roll and storing the roll until use at a temperature below 15° C.

7 Claims, 1 Drawing Figure

PRODUCTION OF POLYVINYLBUTYRAL SHEET ROLLS

BACKGROUND OF THE INVENTION

This invention relates to the production of polyvinyl butyral sheet and particularly to the formation of rolls of the sheet material for storage and transportation.

Polyvinyl butyral (or PVB) is a very important tough plastic that finds its major utility in the production of interlayers for laminated safety glass. When a sheet is laminated between two plies of glass, the resulting laminate is extremely resistant to penetration by an impacting object. This has led to very wide use of the plastic in sheet form for the production of car windshields, security glazing and architectural laminates.

Most frequently the manufacturer of the PVB sheet does not make the laminates himself so that the sheet has to be formed into rolls, stored and transported before it is used.

It is found however that when rolls of PVB sheet are unrolled by the laminator they encounter two serious problems. The first is that towards the center of the roll, for approximately the last ten percent of the sheet on the roll in fact, a serious "blocking" problem is encountered. "Blocking" is a phenomenon displayed by a number of polar thermoplastic sheet materials that causes sheets placed in face-to-face contact under pressure to tend to stick together. A roll of conventional, untreated, thermoplastic sheet is said to be blocked when it is no longer possible to unroll it manually by pulling on the free end without distorting or wrinkling it. Generally manual pull-off forces, as registered by a strain gauge, can be up to about 13.6 kg. Blocking is a particular problem with PVB sheets and is very severe in conventionally wound rolls unless the sheet is dusted with a powder to inhibit adhesion of adjacent plies.

The second problem referred to above is that of retarded strain recovery. The PVB is commonly produced and wound onto rolls in an on-line fashion with the result that the sheet bears within it strain imparted to it during the production process. Further strain and differences in strain are imparted as the successive layers are wound on the relatively non-compressible core. As a result of the accumulated hoop tension effects of outer layers and the resistance to compression of the core, differences in retarded strain recovery can be objectionably high. When the PVB sheet is placed between hot glass laminae in the formation of a laminate the sheet relaxes and shrinks often by as much as fifteen percent or more. Since the amount of shrink varies it is difficult to compensate for this effect accurately.

These and other problems have been minimized by the present invention which provides a means of winding a PVB sheet to produce a roll with essentially no blocking problems and with minimal variation in shrink tendency.

The invention, in a further aspect, provides a means of winding a PVB sheet printed with a color gradient so as to eliminate strike off of dye used to print the gradient at a line corresponding to the leading edge of the initial lap of sheet on a core roll.

SPECIFIC DESCRIPTION OF THE INVENTION

The invention provides a process for the production of a roll of polyvinyl butyral interlayer sheet adapted for use in laminated glazing units which comprises (a) forwarding a polyvinyl butyral sheet through a tension sensing device at a constant tension between 35 and 173 grams per linear centimeter; (b) thereafter winding the sheet on a core rotated at a speed that is responsive to variations in tension picked up by the sensing device such that the sheet is wound at a substantially constant tension between 35 and 173 grams per linear centimeter; and (c) storing the roll at a temperature of below 15° C. until used.

The tension used is herein described as "constant" and this is intended to convey that correction mechanisms respond to restore the targetted tension if the measured tension deviates by more than 10 grams per linear centimeter.

The process of the invention can be used in any PVB sheet production process wherein the sheet is rolled for transport.

The prior art processes have either ignored or bypassed the problem of blocking and variable stretch in a roll of PVB sheet material. In one prior art process the PVB sheet is dusted with a powder such as sodium bicarbonate (that can subsequently be washed off) and wound into a roll. This virtually eliminates the blocking problem that would otherwise develop during transport and storage. Before use the dusted sheet is commonly washed, dried and then cut straight away to the appropriate dimensions.

Other conventional winding processes used with undusted sheet materials are controlled such that the linear take-up rate is constant and equal to the rate at which the sheet is being produced. This is usually considered the most convenient process for a high speed sheet production line.

An important preferred feature of the process of the invention is that the sheet is seasoned before being wound so that at least some of the stresses that are inevitably built into the sheet during the production process have time to be relaxed. In this way the problem of shrinkage on the roll with consequent increase in the blocking effect is minimized. The term "seasoning" in the context of this application means a process in which a freshly produced PVB sheet that has been dusted with an inert powder material (such as sodium bicarbonate) and then wound into rolls is stored at a temperature of 50° to 70° C. for from 3 to 20 days depending on roll size. This seasoning gives the rolls time to relax stresses built into the sheets during the production process and the coating of powder minimizes sticking between contiguous laps on the roll. Upon completion of seasoning the sheet is unrolled and washed to remove the powder under controlled tension such that no substantial stresses are placed on the sheet thereby and then wound up according to the process of the invention.

This relaxation, or seasoning process, is also useful where the sheet has been printed with a color gradient since it allows time for the ink to diffuse evenly through the sheet.

The tension at which the sheet is wound is from 35 to 173 and preferably 40 to 120 grams per linear centimeter. The lower limit is really that which is practical since if the sheet is wound under too low a tension there is a possibility of telescoping, i.e., falling off the roll when the roll axis is placed vertically. In addition tensions below the minimum are technically difficult to achieve in view of the force needed to overcome the bearing friction of the many rolls present in other parts of the conventional sheet transporting mechanism. The upper limit is dictated by the desirability of avoiding placing any recoverable strain within the rolled sheet that would contribute to blocking upon such recovery.

The storing of the rolls is usually at a maximum temperature of about 15° C. and preferably from 7° to 12° C. so as to avoid inducing relaxation of any residual stresses in the roll. Conveniently the sheet is wound into rolls at temperatures in the same range but temperatures of up to 20° C. can be used providing the roll is cooled to below 15° C. directly after it is produced and stored until use at such temperatures. It should be recognized however that if tensions at the higher end of the permitted range are used in conjunction with wind-up temperatures of around 20° C. a tendency to block may be observed. The temperature at which the roll may be wound is also somewhat related to the diameter of the roll. A larger roll should be wound at a lower temperature within the stated range because heat transfer from the center of the roll may be too slow to allow temperature uniformity through the roll to be established during the storage period.

The sheet tension is sensed by a device that conventionally works by detecting the variation in response to a constant opposing force of a moveable roll around which the sheet passes. Thus if the tension in the sheet increases above the set level there will be a net movement of the roll against the constant opposing force. This movement generates a signal in response to which the speed of the take-up roll decreases so as to reduce the tension. Contrariwise if the tension decreases, the take-up rate is increased to raise the sheet tension to the desired level. The device may operate electrically, mechanically or hydraulically.

This sensing device must be located immediately before the winding device with no intervening sheet operation such that the changes it senses are directly related to the changes in tension at which the sheet is wound.

The PVB sheet is adapted for use as an interlayer material for laminated glazing units and in practice this implies a number of characteristics including physical and optical properties. Thus the sheet will be capable of forming an optically clear laminate with enhanced toughness and resistance to penetration. Another significant characteristic is that it has a degree of surface micro-roughness that facilitates de-aeration of laminates incorporating the sheet and minimizes blocking. The significance and extent of the micro-roughness preferred in sheets used in the invention is set forth in U.S. Pat. No. 4,035,549 which is incorporated herein by reference.

The PVB sheet may incorporate plasticizers, buffers, pigments, stabilizers, U.V. absorbents and the like in the manner taught in the prior art. It may also be printed with a color gradient band making it useful in the production of car windshields by known techniques. All such PVB sheets can be used in the process of the present invention.

The sheet is usually wound on the core by stapling the first lap to the core and often this raises no problem. However if the sheet is printed with a color gradient, the resultant slight bump on a line corresponding to the leading edge of the sheet stapled to the core, can lead to strike-off of ink from an inner layer onto the contacting face of the next outer layer. This produces a transverse line of slightly darker color across the color-printed width of the sheet especially near the core where the convexity of the bump is greatest.

It is a preferred feature of this invention that the core be provided with a shallow rabbet formed on the outer surface of the core and having a depth corresponding to about the thickness of the sheet to be wound thereon. One surface of the rabbet is in a radial plane of the core. The other surface, about one inch long, makes a flat angle with the core surface thereby forming a rabbet to accommodate the leading edge of the first lap such that minimal pressure effects are produced on successively wound laps.

The core material can be metal, plastic, wood, fiberboard or cardboard with cardboard the most commonly used material. The manner of fixing the sheet to the roll will depend to some extent on the material but with preferred cores stapling is found to be appropriate. However other means such as springladen traps or longitudinal slots to receive the edge are acceptable alternatives particularly where a non-printed sheet is involved.

DESCRIPTION OF THE PREFERRED EMBODIMENT

Figure 1:
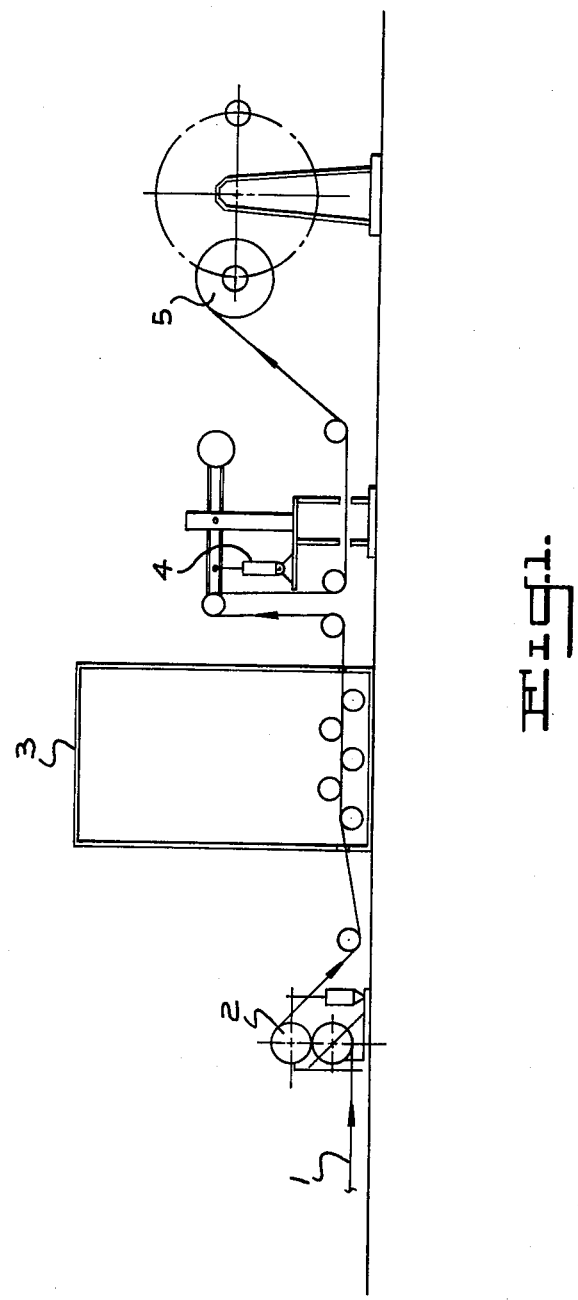
FIG. 1 is a diagrammatic representation of a preferred device for operating the process of the invention.

The invention is further described with reference to FIG. 1 wherein a PVB sheet, 1, is fed at controlled tension through a pull roll stack, 2, and thereafter through an accumulator, 3, and a tension sensing device, 4, before being wound on a take-up roll, 5.

In the practice of the invention the sheet is fed at a constant tension through the accumulator from which it is removed at a constant tension and wound on the take-up roll. The accumulator accommodates sheet during wind-up roll changes so as to permit continuous operation. The speed of rotation of the take-up roll is controlled by a motor which is responsive to variations sensed by the second tension-sensing device.

The above device was used to wind several rolls under several different sets of conditions. The results obtained are set forth in the following examples which are for the purposes of illustration only and are not intended to imply any limitation on the essential scope of the invention.

EXAMPLE 1

A seasoned polyvinyl butyral sheet 0.75 mm in thickness was wound onto a roll at a tension of 209 gm/cm and a temperature of 12.2° C. The roll obtained, which was about 61 cm wide and 36.8 cm in diameter and contained approximately 75 meters of sheet, was stored at 12.8° C. for about 6 weeks. Upon unrolling it was found that the last 4.4 cm (measured along a radius of the roll) of the rolled sheet were completely blocked.

EXAMPLE 2

A polyvinyl butyral sheet similar to that used in Example 1 was wound at a constant tension of 107 gm/cm at an average temperature of 19.4° C. (range 17.8° C. to 21° C.) and directly after winding was stored at 12.8° C. for about six weeks.

The roll was about 76 cm in width, 47 mm in diameter and contained about 110 meters of sheet.

Upon unwinding no trace of blocking was found. In a similar test in which the roll was stored at the wind-up temperature of about 19.4° C., substantial blocking was encountered.

EXAMPLE 3

A 66 cm wide roll of PVB 0.75 mm in thickness that had been dusted with bicarbonate and stored at 60° C. for about two weeks was unwound, washed free of the bicarbonate and wound up in the following manner.

A first roll was formed by winding the PVB at a constant tension of 53.6 gm/cm at a temperature of 12.8° C. and stored at that same temperature for eleven weeks.

A second roll was formed at a constant tension of 143 gm/cm at the same temperature and stored under the same conditions for the same length of time.

Each roll was then unwound at a constant 91.5 cm/sec and the force required to be exerted to maintain this rate was measured using a spring-loaded scale attached to the end of the sheet.

Readings were taken after the initial inertial effects of the roll bearings had been overcome. Since the same take-up roll was used the tensions registered should be an accurate indication of the effect of increasing the tension of wind-up.

In fact the roll wound at the lower tension required an average of 4 kg and the one wound at the higher tension required 5 kg. Both rolls unwound completely rather easily with no evidence of blocking.

What is claimed is:

1. A process for the production of a roll of polyvinyl butyral interlayer sheet for use in laminated glazing units which comprises (a) forwarding a polyvinyl butyral interlayer sheet through a tension-sensing device at a constant tension between 35 and 173 grams per linear centimeter; (b) thereafter winding the sheet onto a core rotated at a speed that is responsive to variations in tension picked up by the sensing device such that the sheet is wound at a substantially constant tension between 35 and 173 grams per linear centimeter; and (c) storing the roll at a temperature of below 15° C. until it is used.

2. The process of claim 1 wherein the sheet is wound at a tension that is maintained throughout at a constant level in the range from 40 to 120 grams per linear centimeter.

3. The process of claim 1 wherein the roll is stored until use at a temperature of from 7° to 12° C.

4. The process of claim 1 in which the sheet has been seasoned for at least ten days at from 50° to 70° C. before being wound.

5. The process of claim 1 in which the sheet is wound on a core provided with a shallow rabbet on the outer surface of the core one surface of the rabbet being in a radial plane of the core and the other surface making a flat angle with the core surface, said rabbet being adapted to accommodate the leading edge of the sheet wound thereon such that minimal pressure effects are produced on successively wound laps.

6. A process for the production of a roll of polyvinyl butyral interlayer sheet adapted for use in laminated glazing units which comprises seasoning a polyvinyl butyral sheet for at least ten days at from 50° to 70° C., then forwarding the seasoned sheet at a constant tension in the range of from 50 to 120 grams per linear centimeter through a tension-sensing device and thereafter winding the sheet on a core rotated at a speed that is responsive to the tension-sensing device such that the sheet is wound at the same constant tension and at a temperature of from 7° to 12° C. and stored at that temperature until used.

7. The process of claim 6 in which the sheet is wound on a core provided with a shallow rabbet on the outer surface of the core of one surface of the rabbet being in a radial plane of the core and the other surface making a flat angle with the core surface, said rabbet being adapted to accommodate the leading edge of the sheet wound thereon such that minimal pressure effects are produced on successively wound laps.

* * * * *